United States Patent
Reddy et al.

(10) Patent No.: US 8,103,803 B2
(45) Date of Patent: Jan. 24, 2012

(54) COMMUNICATION BETWEEN A PROCESSOR AND A CONTROLLER

(75) Inventors: Sreenivas Reddy, Hyderabad (IN); John George Mathieson, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 251 days.

(21) Appl. No.: 12/275,217

(22) Filed: Nov. 21, 2008

(65) Prior Publication Data
US 2010/0131681 A1    May 27, 2010

(51) Int. Cl.
G06F 3/00    (2006.01)
G06F 13/00    (2006.01)

(52) U.S. Cl. ............. 710/5; 710/30; 710/33; 710/105; 710/305

(58) Field of Classification Search .......... 710/5–7, 710/30–35, 105–106, 305
See application file for complete search history.

(56) References Cited

U.S. PATENT DOCUMENTS

| | | | |
|---|---|---|---|
| 4,000,487 A | 12/1976 | Patterson et al. | |
| 4,100,601 A | 7/1978 | Kaufman et al. | |
| 4,553,224 A | 11/1985 | Struger et al. | |
| 4,628,446 A | 12/1986 | Hoffner | |
| 5,293,489 A | 3/1994 | Furui et al. | |
| 5,347,637 A | 9/1994 | Halford | |
| 5,508,909 A * | 4/1996 | Maxwell et al. ............. | 700/18 |
| 5,819,058 A | 10/1998 | Miller et al. | |
| 6,233,641 B1 | 5/2001 | Graham et al. | |
| 6,381,664 B1 | 4/2002 | Nishtala et al. | |
| 6,499,077 B1 * | 12/2002 | Abramson et al. ............ | 710/305 |
| 6,553,446 B1 | 4/2003 | Miller | |
| 6,658,559 B1 | 12/2003 | Arora et al. | |
| 6,678,784 B2 | 1/2004 | Marmash | |
| 6,715,023 B1 | 3/2004 | Abu-Lebdeh et al. | |
| 6,721,813 B2 * | 4/2004 | Owen et al. .................... | 710/6 |
| 6,732,210 B1 | 5/2004 | Mathieson | |
| 6,847,365 B1 | 1/2005 | Miller et al. | |
| 7,332,929 B1 | 2/2008 | Normoyle et al. | |
| 7,380,092 B2 * | 5/2008 | Perego et al. ................. | 711/171 |
| 7,487,327 B1 * | 2/2009 | Chang et al. ................. | 711/203 |
| 7,624,222 B2 | 11/2009 | Nanda et al. | |
| 7,752,413 B2 * | 7/2010 | Hoover et al. ................ | 711/170 |
| 2002/0156943 A1 * | 10/2002 | Ishimura et al. .............. | 710/5 |
| 2003/0131164 A1 * | 7/2003 | Abramson et al. ............ | 710/58 |
| 2006/0059289 A1 * | 3/2006 | Ng et al. ....................... | 710/305 |
| 2008/0282102 A1 | 11/2008 | Reddy et al. | |
| 2010/0057974 A1 | 3/2010 | Reddy et al. | |
| 2010/0153618 A1 | 6/2010 | Mathieson et al. | |

OTHER PUBLICATIONS

Bluethgen, Hans-Martin; "BEE Mux-Demux Implementation for Connecting Subsystems on 2 FPGAs"; Jul. 15, 2002.

(Continued)

*Primary Examiner* — Christopher B Shin (57) ABSTRACT

According to an aspect of the present invention, the communication between processors and peripheral controllers is provided using packets. In an embodiment, the access requests are specified according to a common format such that all the information required for performing each access request is included in a single packet and sent to the peripheral controller. The peripheral controller performs the access request on the external device and generates a response. According to another aspect, the packet format enables the peripheral controller to send responses, requests originating from the external devices and interrupt requests. According to yet another aspect, the packets from processors are first stored in a random access memory (RAM) and a DMA controller retrieves the packets and delivered to the respective peripheral controllers.

20 Claims, 5 Drawing Sheets

OTHER PUBLICATIONS

Micro Computer Control; "IP-201 I2C Bus Multiplexer Board, User's Guide, Revision 1"; Jun. 2000.
Stok, L.; "Interconnect Optimisation During Data Path Allocation"; IEEE 1990.
Erdahl, Mike; "An Open Architecture for Multiplexing and Processing Telemetry Data"; Veda Systems Incorporated; Jul. 15, 1997.
Digital Equipment Corporation; "DH11 asynchronous 16-line multiplexer maintenance manual"; Apr. 1975.
Campbell Scientific, Inc.; "AM16/32B Relay Multiplexer, Instruction Manual"; Oct. 2009.
Jiang et al.; "A Multiplexer Controlled by Fuzzy Associate Memory Leaky Bucket in ATM Networks"; 1997 IEEE International Symposium on Circuits and Systems; IEEE, Jun. 12, 1997.
Notice of Allowance Date Mailed Jun. 2, 2010; U.S. Appl. No. 12/202,444.
Non-Final Office Action Date Mailed Sep. 16, 2010; U.S. Appl. No. 12/202,444.
Notice of Allowance Date Mailed Jan. 27, 2011; U.S. Appl. No. 12/202,444.
Notice of Allowance Date Mailed Apr. 27, 2011; U.S. Appl. No. 12/202,444.
Notice of Allowance Date Mailed Aug. 9, 2011; U.S. Appl. No. 12/202,444.
Xilinx; "Using Dedicated Multiplexers in Spartan-3 Generation FPGAs"; Application Note; May 20, 2005.

* cited by examiner

FIG. 1

| Bit | Name | Description |
|---|---|---|
| 31:23 | Reserved | Reserved |
| 22 | HS_MODE | Enable high speed mode (3.4MHz operation) |
| 21 | CONTINUE_ON_NACK | Enable mode to handle devices that do not generate ACK upon the Reception of a byte. |
| 20 | SEND_START_BYTE | 1 = send a start byte at the beginning of the transaction |
| 19 | READ/WRITE | 1 = READ |
| 18 | ADDRESS_MODE | 1=10 bit mode<br>0 = 7 bit mode |
| 17 | IE | Generate interrupt upon packet completion |
| 16 | REPEAT_START/STOP | 1 indicates to put a repeat start condition on the bus(to continue transaction)<br>0 indicates to put a stop condition on the bus |
| 15 | Reserved | Reserved |
| 14:12 | HS_MASTER_ADDR | High Speed mode Master code |
| 11:10 | Reserved | Reserved |
| 9:0 | SLAVE_ADDR | Slave address |

//COMMUNICATION BETWEEN A PROCESSOR AND A CONTROLLER

BACKGROUND

1. Technical Field

The present disclosure relates to communication within a digital processing system and more specifically to bus based communications with a peripheral controller in such digital processing systems.

2. Related Art

Digital processing systems contain buses to provide communication between various components such as processors, memory elements, and peripherals. Buses are contained within digital processing systems (shorter distance) and contain an express arbiter to allocate the bus to one of the components for transmission. Peripheral Controller Interface (PCI), Serial Peripheral Interface (SPI), SATA (Serial Advanced Technology Attachment) are some example standards defining the operation of corresponding buses, as is well known in the relevant arts.

Buses are contrasted with paths forming basis for networks (connecting digital processing systems) in that such network paths (span long distance) are provided external to digital processing systems and do not have an express arbiter. Instead the common path is shared by relying on distributed techniques such as CSMA/CD (one of the systems takes control of the network first for transmission in a given time duration) or token ring (each system is provided a turn to transmit).

Peripheral controllers are often employed in digital processing systems to facilitate communication with external devices (peripherals). A peripheral controller is a component which interfaces with (has a physical interface attached to) a bus on one side and with the external devices on the other side to facilitate communication between components interfacing with the bus and the external devices. The peripheral controller may be implemented to support the specific communication protocols and other interface requirements, for the bus as well as for individual one of the external devices, to facilitate such communication.

In general, it is desirable that such communications between components (interfacing with a bus) and the external devices be provided while meeting one or more of requirements such as reduced overhead for the components and/or peripheral, the duration of usage of the bus, etc.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. OVERVIEW

According to an aspect of the present invention, the communication between processors and peripheral controllers is provided using packets. In an embodiment, the access requests are specified according to a common format such that all the information required for performing each access request is included in a single packet and sent to the peripheral controller. By using such packet based communication, the overhead on processors may be less than in a situation when the processors use alternative prior art techniques briefly described in sections below.

According to another aspect of the present invention, processors first store packets in a random access memory (RAM). A DMA controller thereafter retrieves the packets and delivers them to the respective peripheral controllers, for example, upon receiving a 'go' indication from the processor. As the processor can store many packets and then request DMA transfer, the overhead on the processor is further reduced.

According to another aspect, the packet format enables the peripheral controller to send responses, requests originating from the external devices and interrupt requests according to a common format. The peripheral controllers may also store the packets in a RAM before the packets are examined by the processor. Overhead on the processor and peripheral controller may also be reduced due to such a feature.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. EXAMPLE SYSTEM/DEVICE

Figure 1:
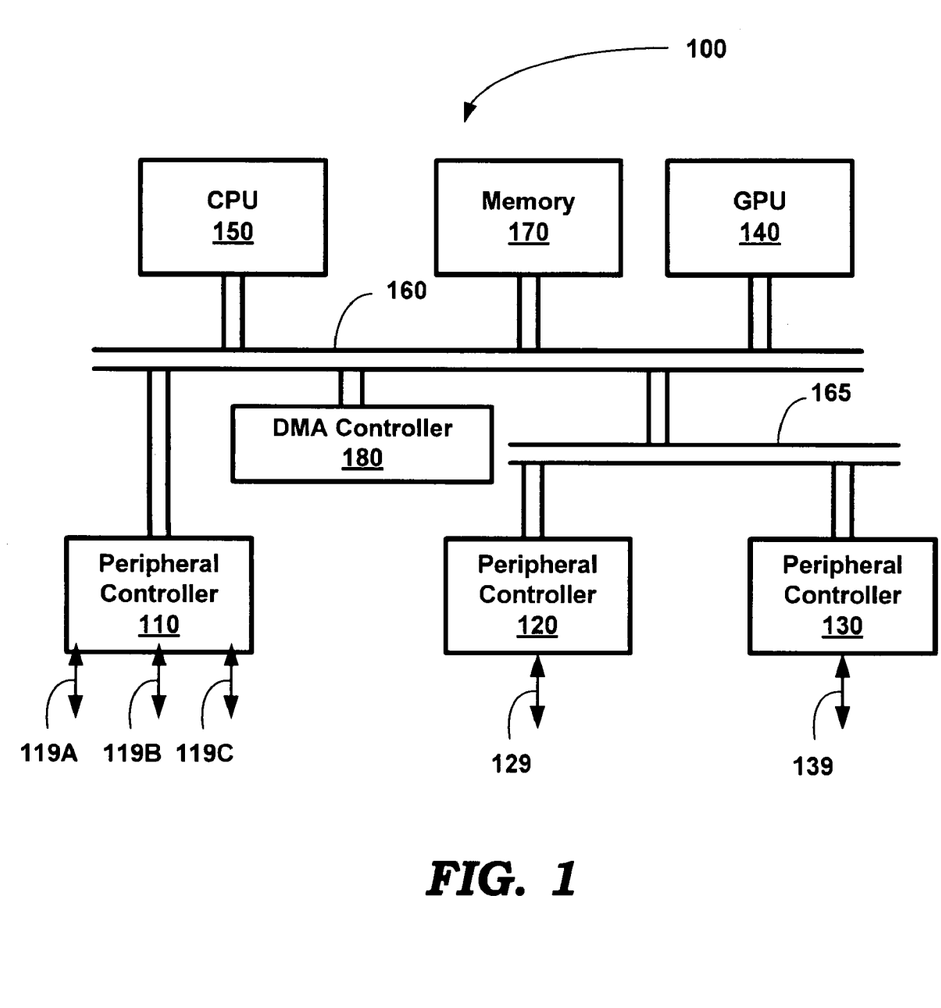
FIG. 1 is a block diagram illustrating the details of an example device in which several aspects of the present invention can be implemented.

FIG. 1 is a block diagram illustrating the details of an example digital processing system in which several aspects of the present invention can be implemented. System 100 is shown containing peripheral controllers 110, 120 and 130, graphics processing unit (GPU) 140, central processing unit (CPU) 150, buses 160/165, memory (RAM) 170, and direct memory access (DMA) controller 180. Each block is described below in further detail.

All the blocks of FIG. 1 may be fabricated in a single integrated circuit (package). At least in such a situation, each of the externals paths 119A-119C, 129, 139, etc., represents external interface pins, as described below. In addition, each of CPU 150, memory 170, DMA 180 and GPU 140 is referred to as a component.

Bus 160 provides a high speed internal communication path (within system 100) between various components. Bus 165 also is an internal communication path, potentially of lower speed, used for communication with the legal or lower speed external devices. Though the below description is provided with respect to bus 160 and connected peripheral controller 110, the description is applicable to other buses as well.

It is assumed that CPU 150 operates as a bus arbiter in terms of granting bus 160 to one of the components to send data. Thus each of the bus may contain additional paths for the respective components to request control of bus (for transmission) and to receive a grant signal when the System 100 may operate based on a clock signal, with a bus cycle potentially having multiple clock cycles (according to any pre-specified convention) 7. CPU 150 thus grants access rights to one of components (140, 150, 170, 180 and bridge connecting buses 160 and 165 (not shown)) for each bus cycle. Bridge connecting buses 160 and 165 may operate as an arbiter for granting access to bus 165.

Memory 170 stores various instructions and data, which are used by CPU 150 in providing various user applications (e.g., databases, playing songs/video, etc.) and operating environment (operating system, drivers, etc.,) which are shared by the user applications in accessing hardware resources provided within system 100.

CPU 150 executes instructions retrieved from memory 170. Some of the instructions cause communication with the external devices via the respective peripheral controllers, according to several aspects of the present invention described below.

GPU 140 generates display signals (e.g., in RGB format) to display units (not shown). The display signals represent image frames formed by GPU 140 based on data received from CPU 150. GPU 140 (akin to CPU 150) may send access requests to external devices according to several aspects of the present invention. Accordingly, both of GPU 140 and CPU 150 are referred to as processors.

DMA controller 180 operates to transfer data units stored in memory 170 to a desired component. As is well known, in a typical DMA based transfer, a component (e.g., CPU 150) stores the desired data to be transferred in a specific location of memory 170, and then sends a transfer instruction to DMA controller 180 specifying a destination component (e.g., peripheral controller). The DMA controller then transfers the data in the memory to the specified component.

The DMA controller represents an access component, which transfers the data units from the memory to the intended destination according direct memory access technology well known in the relevant arts. However, the access components can be implemented using other access technologies to reduce the overhead on the processors.

Each peripheral controller 110/120/130 interfaces with (has a physical interface attached to) a bus (160 or 165) on one side and with the external devices on the other side to facilitate communication between components interfacing with the bus and the external devices. Thus, each of paths 119A-119C, 129 and 139 may have a corresponding set of external devices. Each path may be according to a corresponding interface protocol (such as I2C, I2S, UART, USB, etc.), as is well known in the relevant arts. The description is hereafter provided substantially with respect to peripheral controller 110, though the description is applicable to other controllers as well.

An aspect of the present invention enables efficient communication between components and peripheral devices by using a packet format, which enables all information required for various access requests (read, write, interrupt, etc.) to be included in a single packet.

According to another aspect of the present invention, the single packet is transferred using DMA technique.

The advantages of such features will be clearer in comparison to some prior approaches. Accordingly the prior approaches are described next. The example prior approaches are described with respect to FIG. 1 merely for ease of understanding.

3. PRIOR APPROACHES

In one prior approach, the peripheral controller contains registers, which are mapped to processor memory address space (with part of the space being in RAM/memory 170). Thus, processor 150 may write to corresponding memory addresses to cause data representing request type (read or write, etc.,), control information (e.g., baud rate, CRC type, etc. in case of a modem as the external device) to be stored in corresponding registers.

In case of write requests, processor 150 similarly writes data into appropriate data registers (using memory mapped addresses) as required preparatory actions. The execution of the request is thereafter initiated within a peripheral controller, when a corresponding bit position is set (e.g., to 1) by an appropriate write operation by processor 150.

In response, peripheral controller 120 generates a response (e.g., a success/failure indication for read/write requests and read data in case of read requests) and stores the response data in appropriate registers (internal to peripheral controller). The peripheral controller may then set an internal register to a pre-specified value to indicate that the response data is ready for processor 150 to read the response registers. Processor 150 then retrieves the response data from the response registers.

Peripheral controller 120 may also initiate access requests (in response to corresponding commands received from the external devices) by writing the appropriate registers and/or sending an interrupt signal to the processor, which then reads the pre-defined registers.

Each of the register write/read operations are independent and the program logic in the processor needs to ensure that all the necessary setup is performed before writing appropriate data to initiate the performance of the access request on the external device (by the peripheral controller). Due to the multiple transactions being performed for a single access request, a corresponding amount of overhead may be present for the processor and the peripheral controller. It may be noted that each transaction is independent and has corresponding begin and end within that access cycle.

To allow external devices to communicate with different interface protocols (I2C, UART, etc.), a corresponding number of peripheral controllers are used. For example, peripheral controllers 120 and 130 may respectively be operable in conjunction with devices of I2C and UART protocols. CPU 150 (or program logic executed by the CPU) may accordingly need to be implemented to take into account the presence of different controllers (different memory mapped address), etc. Such complexity adds to the overhead of development/design of programs.

An improvement to the above approach is to provide a multiplexor between the peripherals 120/130 and paths 129/139 such that either path/pin can be assigned to a specific protocol supported by either controller 120/130. However, the program logic of processor 150 needs to be implemented taking into account the requirements of different protocols, etc., as noted above.

In another prior approach to writing information, CPU 150 first stores the data to be written in peripheral controller 120 using memory 170/DMA controller 180 combination, and then stores an appropriate register value in peripheral controller 120 to cause peripheral controller to execute the write operation on the external device connected on interface path 129.

In this prior approach also, CPU 150 performs multiple transactions with all the other components together and the information needed for executing an access request in distributed in different transactions.

Various aspects of the present invention provide for an improved communication approach between the components and the peripheral controllers, as described below in further detail with examples.

4. PACKET FORMAT

Figure 2A:
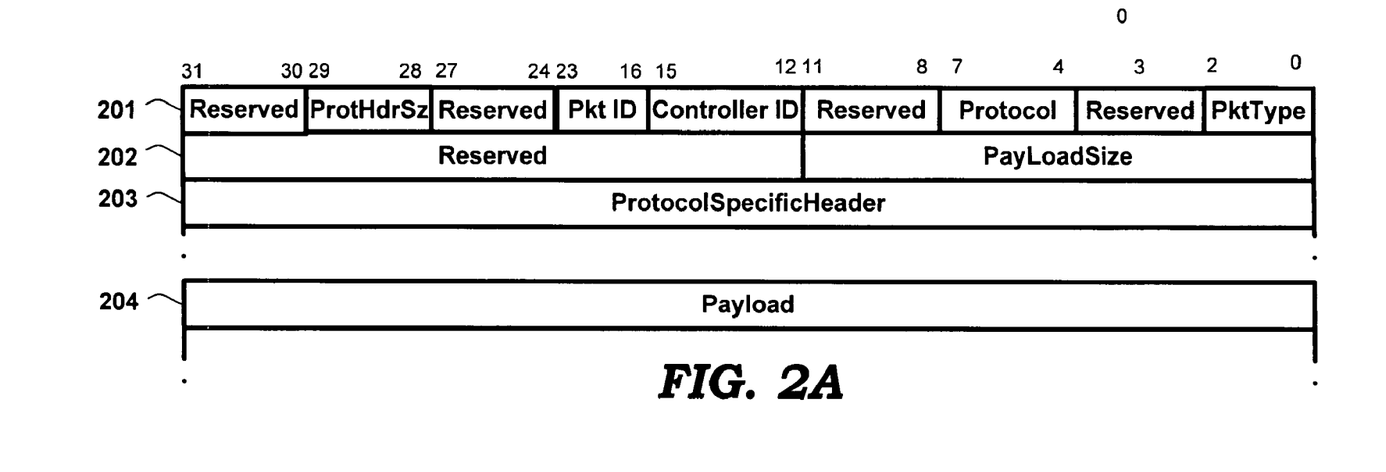
FIGS. 2A-2D together illustrates the packet format used in sending packets between a processor and a peripheral controller in an embodiment of the present invention.

FIG. 2A is an example packet format according to an aspect of the present invention. It should be appreciated that a packet has a defined beginning and end, which can be specified based on various conventions (e.g., specific data pattern indicating end of packet, having length of the content, etc.). The packet format permits read, write and control requests to be encoded in a single format, as described below.

The packet is shown as 32 bit words. As shown there, the packet type is indicated in the first 3 bits (positions 0 to 2) of the packet format. The packet type can be one of a request from a processor to the peripheral controller, a response from the peripheral controller back to the processor, an interrupt or a stop command as depicted there in FIG. 2B.

Figure 2B:
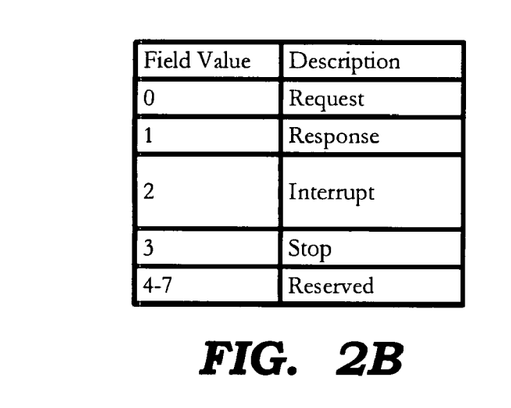

The requests and responses are described in sections below. An interrupt is from a peripheral controller to CPU 150 indicating some condition requiring attention from CPU 150. The condition may be communicated either by the external device or detected by peripheral controller 110 while interfacing with the external device. The information related to the condition is included in the rest of the packet.

On the other hand, a stop packet type implies that the receiver of that packet has to stop further processing of packets and optionally may have to return to and idle state or reset itself. A stop packet causes the flow to be stopped so that CPU 150 can come in and do any maintenance or accounting work that may need to be done.

Bits in positions 3, 8-11, 24-27 and 30-31 in word 201 and positions 12-31 in word 202 are shown as being reserved for future use. The label 'Reserved' implies that the format can be extended to cover other situations.

Figure 2C:
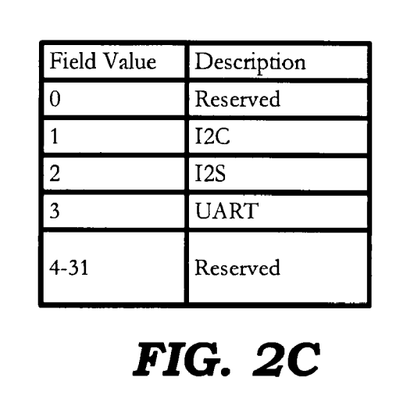

Bits in positions 4-7 (4 bits) indicate a protocol according to which the rest of the format is formed. As depicted in FIG. 2C, the protocols can be one of I2C, I2S and UART for values of 1, 2 and 3 respectively. Values of 0 and 4-31 are reserved for future use.

Bits in positions 12-15 (4 bits) indicate a unique identifier of the controller which is either a recipient (in case CPU 150 is sending the packet) or a source (in case a peripheral controller is sending the packet). Alternatively, the combination of protocol field and the controller identifier field may uniquely identify the controller.

Bits in positions 16-23 (8 bits) indicate a unique packet identifier, which can be used, for among other functions, to correlate a response associated with a previously sent access request.

Flows of requests and responses are facilitated by using a unique identifier in requests and responses. A flow implies identification of the same request/response based on the content of the packet. As described in further detail below, the flows are maintained while using the DMA controller 180 in between as well.

Figure 2D:
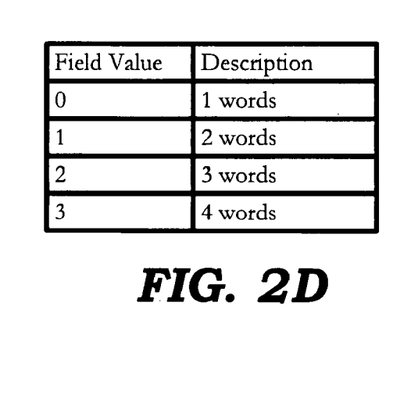

Bits in positions 28-29 (2 bits) are used to indicate the size of the protocol specific header. Values of 0, 1, 2 and 3 respectively indicate the header size to equal 1, 2, 3, and 4 words (32 bits) respectively as shown in FIG. 2D.

Bits in positions 0-11 (12 bits) of word 202 indicate the payload size (shown after IO Protocol specific header in FIG. 2A). The payload (following the protocol specific header) can thus be maximum of 1024 according to this example convention.

The payload follows the I/O protocol specific header. The length of the payload can vary in different access requests due to the payload size field noted above. In case of write access requests, all the data sought to be written (which is already available) can be included within a single packet, provided the amount of data is below the maximum size permitted by the packet.

The protocol specific header depends on the specific protocol indicated in the packet format field noted above. In general, whatever 'preparatory' information is written using the memory mapped approaches (noted above) into respective registers (prior to starting the execution of the request) can be encoded into the I/O protocol specific header. In an embodiment, the initiation of the access request (to the external device) is implicitly specified by sending the packet itself.

The design of the content of the protocol specific header will be apparent to one skilled in the relevant arts based on the corresponding protocol specifications. An example content of protocol specific header is described below for illustration.

5. PROTOCOL SPECIFIC HEADER

Figure 3:
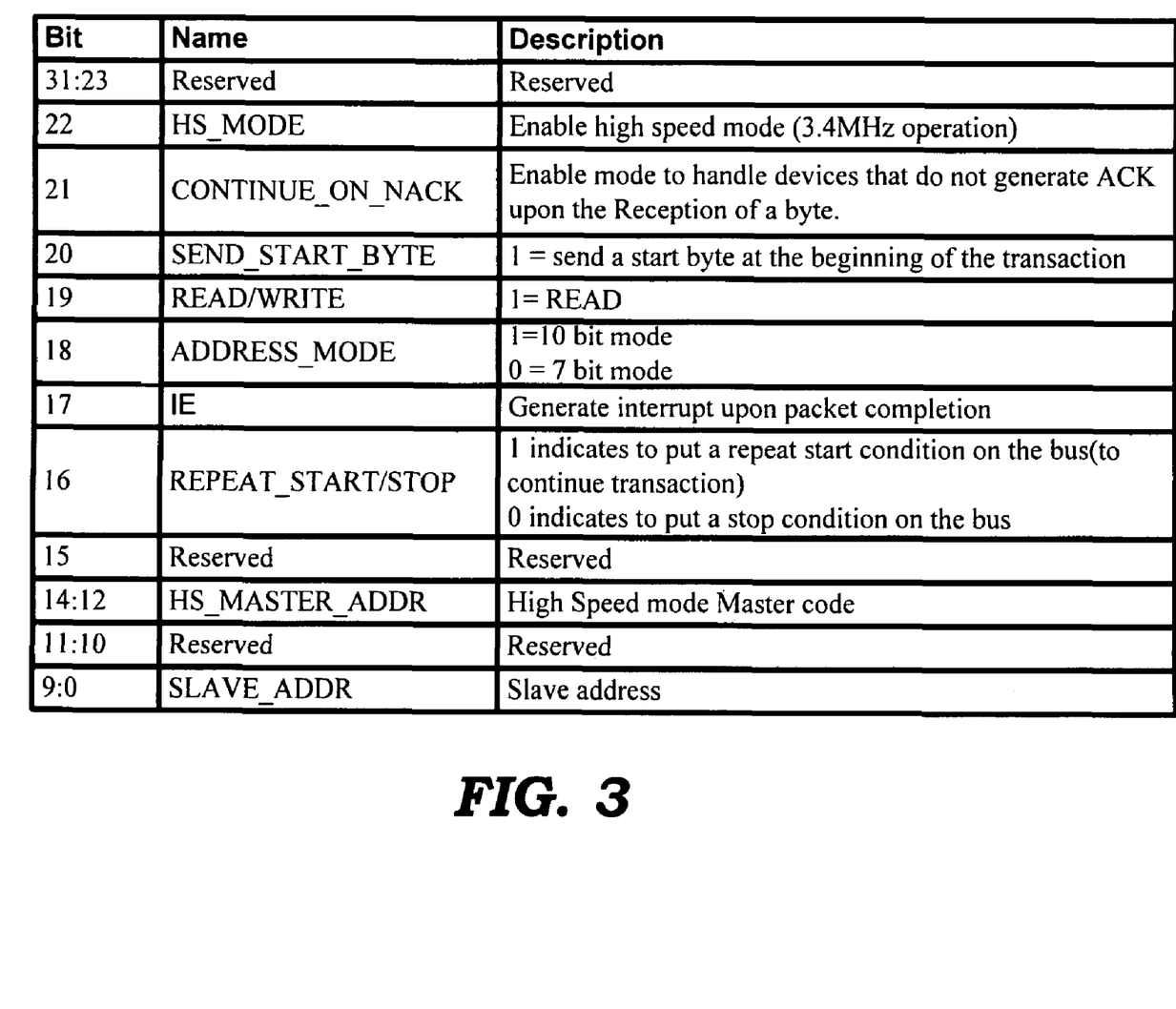
FIG. 3 illustrates the protocol specific portion of packet content for I2C protocol, in an embodiment.

FIG. 3 depicts the content of the protocol specific header for I2C protocol in case of requests sent to a peripheral controller according to an example convention. Bits 0-9 contain a slave address, identifying the specific one of the external devices connected to the same I2C bus. For example, assuming that path 119A is according to I2C, multiple external devices may be connected on path 119A and the slave address contains the address of the specific device to which the packet is destined or from which the packet originated. Bits 10-11, 15 and 23-31 are reserved for future use.

Bits 12-14 are used to indicate one of the eight high speed master codes in I2C high speed transfer mode format. As is well known in the relevant arts, the codes are used to arbitrate for the bus between high speed masters present on the I2C bus.

Bit 16 is used to represent the handshaking signal that represents different conditions such as continue transmission or stop transmission on the I2C bus. In one embodiment, bit value 1 indicates repeat_start condition, in which the target external device continues transmission. A bit value of 0 represents a stop instruction, requesting the target external device to stop transmission on the I2C bus.

Bit number 17 is used by CPU 150 to request controller 110 to generate an interrupt upon completion of processing of the present packet. If the bit is set to 1, peripheral controller 110 sends an interrupt to the CPU 150 once packet is processed. The interrupt can be either using one of the packet types or based on other mechanisms (e.g., asserting a specific signal path).

Bit 18 is used to indicate address modes supported on the I2C bus. If a bit value is set to 1, peripheral controller 110 uses 10-bit address mode on the I2C bus. Peripheral controller 110 uses 7-bit address mode otherwise.

Bit number 19 is used to indicate whether the request is a read request or a write request.

Bit number 20 is used to request the controller to use start byte in the I2C data transmission. Controller includes a start byte (00000001) on the I2C transmission if the bit 20 is set to 1.

Bit number 21 is used to request peripheral controller 110 to continue transmission even when the acknowledgement is not received from the corresponding external device. Thus, when peripheral controller sends data to an external device, an acknowledgement is generally expected. When bit number 21 is set to 1, the peripheral controller may continue to transmit data to the external device without waiting for the acknowledgements from the external device.

Bit number 22 is used to request peripheral controller 110 to transmit using high speed mode (3.4 Mb/s) or normal mode (F/S mode). If the bit value is set to high, the controller 110 transfers the data in high speed mode on I2C bus to the corresponding external device.

While the packet format of above can be used directly between processor 150/140 and peripheral controller 110, an aspect of the present invention uses DMA controller 180 to reduce the overhead on CPU 150, as described below in further detail.

6. ACCESS REQUESTS USING CONTROLLER

Figure 4:
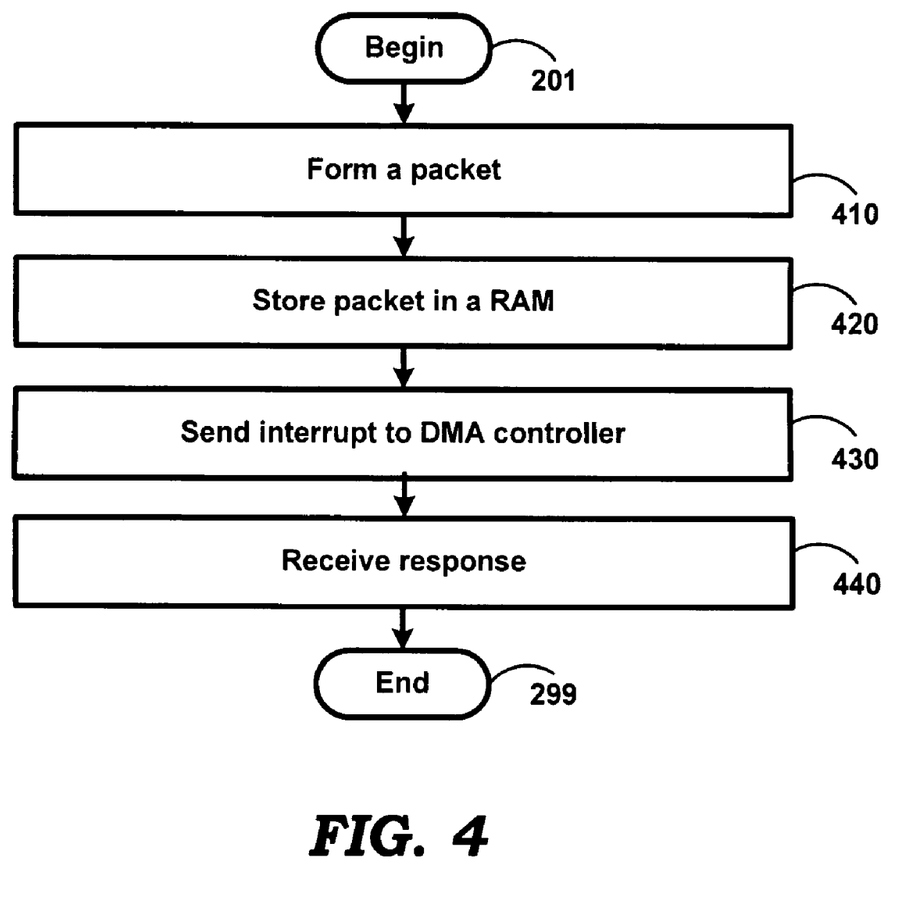
FIG. 4 is a flow chart illustrating the manner in which packets are transferred from a processor to a peripheral controller in an embodiment of the present invention.

FIG. 4 is a flowchart illustrating the manner in which communication is performed between a processor and a peripheral controller in an embodiment of the present invention. The flowchart is described with respect to a processor sending an access request to a peripheral controller. The features can similarly be applied with respect to other peripheral controllers as well.

In addition, the steps are described in a specific sequence merely for illustration. However, alternative embodiments in accordance with the present invention can be implemented to perform the steps in a different sequence or in an overlapping manner (in time domain), as will be apparent to one skilled in the relevant arts by reading the disclosure provided herein. The flowchart begins in step 401, in which control immediately passes to step 410.

In step 410, CPU 150 forms a packet corresponding to an access request. The packet may be formed according to the format described above. The controller identifier in bit positions 12-15 identify the specific peripheral controller to which the packet is to be eventually delivered.

In step 420, CPU 150 stores the packet in RAM 170. It should be appreciated that the packet may be viewed as containing multiple portions (e.g., the payload itself containing multiple portions) and each portion may be written into RAM 170 as the corresponding portion is formed. Furthermore, each portion may be stored in the RAM as soon as the corresponding data is generated. Thus, the packet transmission to RAM 170 may span multiple non-contiguous bus cycles. The transmission from the DMA controller to the peripheral controller also may similarly span multiple bus cycles.

In step 430, CPU 150 sends an interrupt to DMA controller 180. The specific locations at which the data forming the packet is stored in RAM 170 is stored, may be communicated by an appropriate convention. For example, a specific designated memory space in RAM 170 may be used to indicate a list of packets stored (which is cleared by the DMA controller upon transfer of the packets to the corresponding destinations). The information for each of the list of packets may then point to the specific locations of memory where the words/bytes of data for the packet are stored.

Accordingly, CPU 150 may store multiple packets, with different packets directed to different or same peripheral controller and then send a single interrupt. DMA controller 180, upon receiving the interrupt may transfer each packet to the specific peripheral controller identified by the controller identifier in the packet. Thus, DMA controller 180 needs to be designed to examine the controller identifier field to determine the destination of each packet in the memory and then transfer the packet to the determined target.

In step 440, CPU 150 receives a response the access request. The response may again be received from the source controller via memory 170. The response may also be according to the format of FIGS. 2A-2D. The controller identifier identifies the specific peripheral controller (source controller) from which the packet is received. The flow chart ends in step 499.

Due to the use of DMA controller 180, it should be appreciated that the overhead to CPU 150 is reduced. For example, when sending access requests to multiple peripheral controllers, CPU 150 may write all the packets into memory 170, and then send a single interrupt request to DMA controller 180 (which then transfers each packet to the respective controller). Accordingly, the overhead/complexity in terms of having to comply with the speed/interfacing requirements of the individual controllers is avoided within the processing logic executed by CPU 150.

Similarly, when a peripheral controller sends multiple responses or requests, the corresponding packets may be written to memory 170 and a single interrupt generated to CPU 150, which reads the packets. The number of interrupts to CPU 150 is reduced as a result.

It should be generally appreciated that peripheral controllers need to be implemented in a cooperative manner for the above features to be operative. The description is continued with respect to the details of an example embodiment of peripheral controller for illustration.

7. PERIPHERAL CONTROLLER

Figure 5:
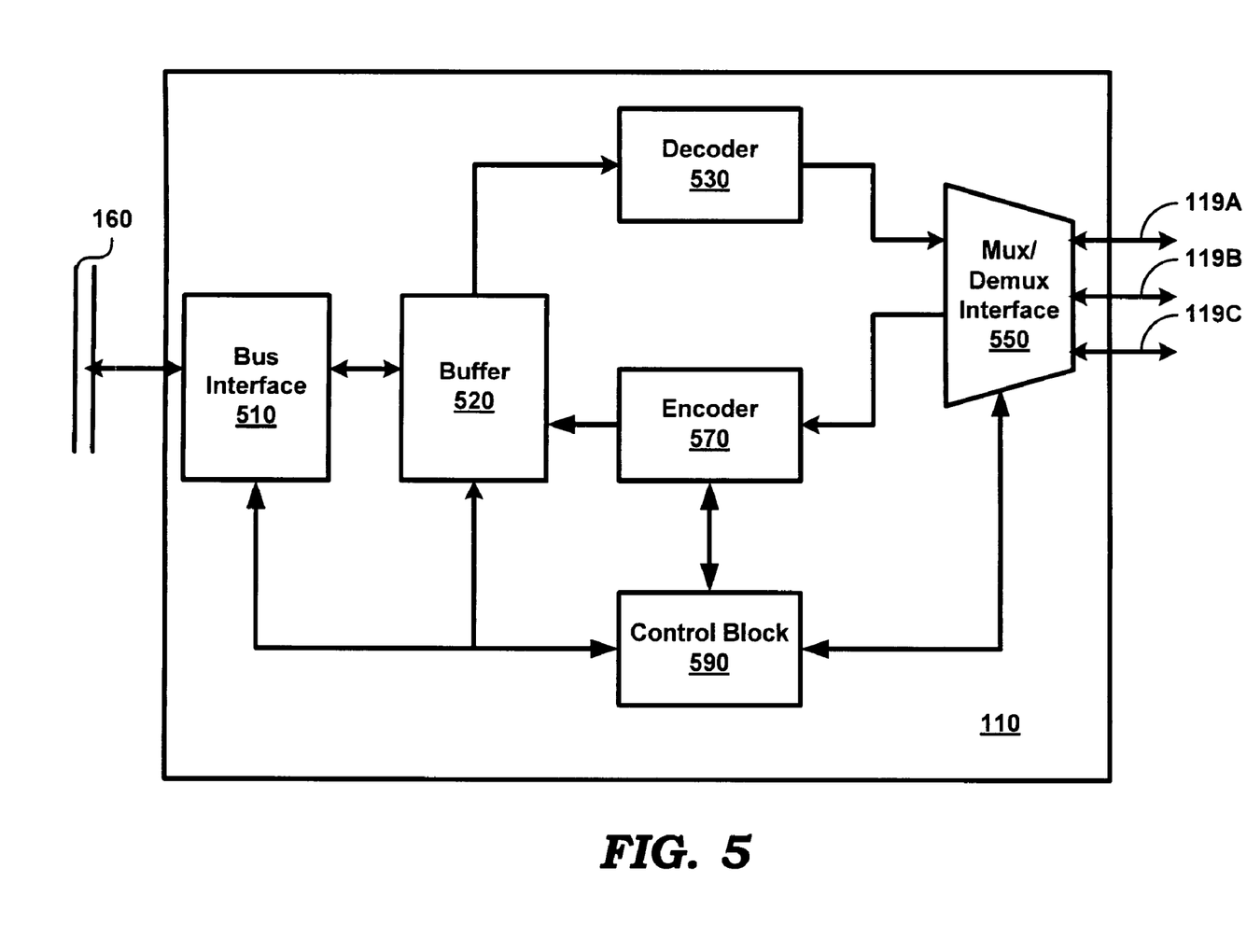
FIG. 5 is a block diagram illustrating the details of a peripheral controller in an embodiment of the present invention.

FIG. 5 is a block diagram illustrating the details of a peripheral controller in an embodiment of the present invention. Peripheral controller 110 is shown containing bus interface 510, buffer 520, packet decoder 530, mux/demux interface 550, encoder 570 and control block 590. Each block is described below in further detail.

Bus interface 510 provides the physical, electrical and bus protocol interfaces necessary for a peripheral controller to seek control of the bus for transmission (by interfacing with an arbiter, not shown), to transmit packets, and also to receive packets on the bus. The received packets are stored in buffer 520. As noted above, a packet may be received in non-contiguous bus cycles. Similarly, packets stored in buffer 520 are transmitted under the control of control block 590. Bus interface 510 can be implemented in a known way.

Decoder 530 decodes each received packet according to the protocol specified in the protocol field and sends the data consistent with the specified protocol to mux/demux 550. The specific destination/protocol information may also be sent to control block 550 to ensure that each packet is forwarded on appropriate one of the output paths 119A-C.

In general, each of the protocol specific codes (or other information) is passed to control block 590 for taking the appropriate action (in terms of interfacing with both the processor and the external devices). In addition, the specific data that is required to be passed to the external device is packaged according to the interface requirements of the protocol and then sent to the external device. For example, in case of I2C protocol, the slave address (bits 0-9 of FIG. 3) may be included in the data units sent on path 119A.

Thus, decoder 530 needs to be designed to examine the value in each field according to the protocol and generates the appropriate data units thereafter. The implementation of decoder 530 will be apparent to one skilled in the relevant arts by reading the corresponding protocol specification.

Mux/demux interface 550 enables any of the paths 119A-C to be configured for any one of the protocols (assuming the same physical interface/port structure for all). The interface can be implemented as multiple units such that each path can receive/send signals/data in parallel. In general, the control signals (including mux select value, which determines the specific path on which a data unit or signal is transmitted) received from control block 590 ensure that the data units/signals destined for a particular path are sent on that path.

Encoder 570 operates to form the packets that are sent to the processors. The packets can be responses to previous received requests, requests originating from the external devices, interrupts, etc. Some of the packets (e.g., interrupt enable bit 17 of FIG. 3 is set or interrupt packet type) may be formed automatically without requiring the corresponding data from the external devices. On the other hand, responses and requests would contain the data received from the external device. The packets thus formed are stored in buffer 520 and such storing is communicated to control block 590, which causes the packet to be dispatched on bus 160.

Control block 590 coordinates and controls the operation of the remaining blocks, though some of the connections (e.g., to packet decoder 530) are not shown for conciseness. The operation of control block 590 is described with respect to some example below.

8. CONTROL BLOCK

When a packet is received from bus 160, control block 590 is notified by bus interface 510 of the storing of the packet in buffer 520. Control block 590 may receive from decoder 530, field and value pairs received in the packet (including the protocol specific information). Control block 590 performs the necessary actions in response.

For example, when a received packet specifies a particular speed, control block 590 (upon receiving the corresponding information from decoder 530) cause mux/demux interface to generate any needed synchronization signals, etc., on the output path to setup the path for that speed. In general, control block 590 ensures that a received packet is processed appropriately by the remaining blocks.

Similarly, when an external device sends requests/responses, control block ensures that the data units are received, encoded (by appropriate interface with encoder 570) according to the packet formats described above, and sent to memory 170 for storing there. Thus, bus interface 510 causes the packet to be stored in memory 170. Control block 590 then sends an interrupt at an appropriate time point to indicate that the packet is ready for the processor to process. CPU 150 retrieves the packet and examines the packet for the response (or processes the interrupt in case the packet indicates an interrupt).

Furthermore, when a packet content requests a certain action to be performed, the corresponding information is received from decoder 530 and control block 590 performs the corresponding action. For example, if a received pair indicates that an interrupt request is to be generated after completion of processing of the request, control block 590 may cause appropriate data units/signals to be forwarded on the path (assuming processing of the packet requires such an action) to complete processing of the request, and then generate an interrupt to the processor, as requested.

Thus, using the approaches above, efficient bus based communication may be provided between a processor and peripheral controllers according to various aspects of the present invention.

9. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A system comprising:
   a bus;
   a peripheral controller coupled with said bus and also coupled to an external device; and
   a processor coupled with said bus,
   said processor operable to send an access request in the form of a single packet according to a format on said bus, said format comprising fields for specifying all the information for executing said access request,
   said peripheral controller operable to receive said access request and perform said access request on said external device.

2. The system of claim 1, further comprising:
   a memory coupled with said bus, said processor operable to store said single packet in said memory.

3. The system of claim 2, further comprising:
   an access component operable to retrieve said single packet from said memory and to send said single packet to said peripheral controller.

4. The system of claim 2, wherein said
   processor is operable to indicate to an access component that said single packet is ready to be transferred to said peripheral controller after storing said single packet.

5. The system of claim 1, wherein said single packet comprises a field indicating whether said access request is a read request or a write request.

6. The system of claim 1, wherein said peripheral controller comprises a decoder operable to decode said single packet.

7. The system of claim 1, wherein said peripheral controller comprises a first protocol interface to communicate with an external device of a first protocol.

8. The system of claim 7, wherein said peripheral controller further comprises a second protocol interface to communicate with an external device of a second protocol.

9. The system of claim 1, wherein said
   peripheral controller comprises an encoder operable to receive a response data.

10. A peripheral controller comprising:
    a plurality of ports, each operable to provide connectivity to an external device;
    a bus interface operable to receive on a bus an access request in the form of a single packet according to a format which comprises fields for specifying all the information for executing said access request;

a buffer operable to store said single packet, wherein said buffer is coupled to said bus interface; and a decoder operable to decode said single packet stored in said buffer, wherein said decoder is coupled to said buffer and said plurality of ports;

wherein content of said single packet is used to determine which port to send content of said single packet.

11. The peripheral controller of claim 10, wherein each of said plurality of ports is operable according to a protocol.

12. The peripheral controller of claim 10, wherein said peripheral controller is operable to send each packet after forming the packet completely.

13. The peripheral controller of claim 10, wherein said packet comprises a field requesting said peripheral controller to send an interrupt after completing processing of said packet.

14. The peripheral controller of claim 10, further comprising an encoder operable to receive a response data wherein said encoder is coupled to said plurality of ports.

15. The peripheral controller of claim 10, further comprising an interface operable to configure a port for a protocol, wherein said interface is coupled to said plurality of ports.

16. A method comprising:

forming an access request in a single packet comprising fields for specifying all the information to perform said access request;

sending said access request on a bus to a peripheral controller;

said peripheral controller receiving said access request; and said peripheral controller performing said access request on an external device coupled to said peripheral controller.

17. The method of claim 16, wherein said single packet comprises a protocol identifier that indicates a protocol for performing said access request.

18. The method of claim 16, further comprising:

storing said single packet in a memory via said bus; and wherein said sending said access request comprises an access component sending said single packet from said memory to said peripheral controller via said bus.

19. The method of claim 18, further comprising:

after said storing said single packet, sending an interrupt to said access component.

20. The method of claim 16, wherein said single packet comprises an identifier of said peripheral controller.

* * * * *